July 24, 1962            F. R. HARPER            3,046,198

BLOOD PRODUCT AND METHOD OF PREPARATION

Filed April 24, 1958

FIG. I

Draw-off Animal Blood under sterile conditions and stand to clot.

↓

Stand serum 2 hours at room temperature and refrigerate 6 to 72 hours to cast down blood cells and other sediment.

↓

Cell-free serum decanted or aspirated under sterile conditions with filtering.

↓

Acidify serum to pH 1.9 with 70 to 74 ml. of 2 N HCL per liter of serum.

↓

React with 200 mg. Crystalline Pepsin dissolved in 50 ml. of N/10 HCl per liter serum and incubate at 20°C. to 40°C. for 45 minutes to 60 minutes.

↓

Buffer to pH 7.5 with 35 ml. of 5 N NaOH per liter serum, intermix and filter.

↓

Add 10 ml. Aqueous Solution of 37% Formaldelyde per liter buffered serum and incubate at room temperature 3 hours while shaking.

↓

(continued)

INVENTOR.
Frederick R. Harper
BY
HIS ATTORNEY

July 24, 1962  F. R. HARPER  3,046,198
BLOOD PRODUCT AND METHOD OF PREPARATION
Filed April 24, 1958
4 Sheets-Sheet 2

FIG. 1 (continued)

Add 1/10th volume of spg. 0.88 concentrated $NH_4OH$ with constant stirring.

Alkalize to pH 9.5 with 10 ml. 5 N NaOH per liter serum.

Heat 90°C. to 95°C. for 30 minutes to destroy Agglutination Factors.

Buffer to pH 7.2 with 20 ml. of 2 N HCL per liter serum.

INVENTOR.
Frederick R. Harper
BY
HIS ATTORNEY

EFFECT OF TIME & TEMPERATURE ON VISCOSITY & COLLOID OSMOTIC PRESSURE OF PEPSIN TREATED BEEF SERUM

IONOGRAPH OF RAW BEEF SERUM

Beta and Gamma Globulin    Alpha Globulin    Albumin

IONOGRAPH OF TREATED BEEF SERUM
MADE FROM SAME SAMPLE OF RAW SERUM

INVENTOR.
Frederick R. Harper
BY
HIS ATTORNEY ized July 24, 1962

3,046,198
BLOOD PRODUCT AND METHOD OF PREPARATION
Frederick R. Harper, Denver, Colo., assignor to Vernon F. Taylor, Jr., Denver, Colo.
Filed Apr. 24, 1958, Ser. No. 730,709
5 Claims. (Cl. 167—78)

This application for patent is a continuation-in-part of my copending application Ser. No. 575,897 filed April 3, 1956, now abandoned, which in turn is a continuation-in-part of my application Ser. No. 533,215 filed September 8, 1955, entitled Blood Product and Method, now abandoned, which application was a continuation-in-part of my application Ser. No. 436,999 filed June 15, 1954, now abandoned. My invention relates generally to the preparation of a non-antigenic, non-reactive and non-toxic solution of whole protein. More particularly, it concerns the method of preparing blood of such animals as cattle, horses, swine, sheep and the like, and the prepared product itself, that may safely and expeditiously be employed as a plasma expander for use in humans.

An object of my invention is to provide a method of treating animal blood of which bovine, equine, porcine, and ovine and general similar bloods are typical, in ready, certain and predictable manner and all at minimum investment in equipment and labor, thereby conditioning the non-cellular fluid resulting therefrom to impart long-storage qualities thereto, with subsequent thoroughly compatible introduction into the human blood stream.

Another object is to provide a method of treating animal fluid protein in the general manner described, characterized both by its simplicity and by the certainty with which an end product is rapidly achieved which can thereafter, and with high degree of safety, either be used immediately or stored for long periods of time and thereafter employed for its intended purpose.

A still further object is to produce a solution of whole protein obtained from animal blood fluids, subsequently treated in simple and certain manner to condition it for thorough compatibility with human blood and enabling it to be stored for substantial periods of time prior to use, thereby achieving a blood extender combining the attributes of high compatibility with human blood, along with low cost of production.

All these, as well as many other highly practical objects and advantages attend the practice of my invention, and these will be obvious in part and in part pointed out hereinafter, during the course of the following disclosure.

Accordingly, my invention may be considered as residing in the mixture of materials and combination of ingredients, and in the several procedural and manipulative steps, and the relation of each of the same to the other, the scope of the application of all of which is more fully set forth in the claims at the end of this specification.

As illustrative of certain features of my invention:

FIG. 1 is a flow sheet, illustrating the manipulative steps according to my new practice;

Figure 2:
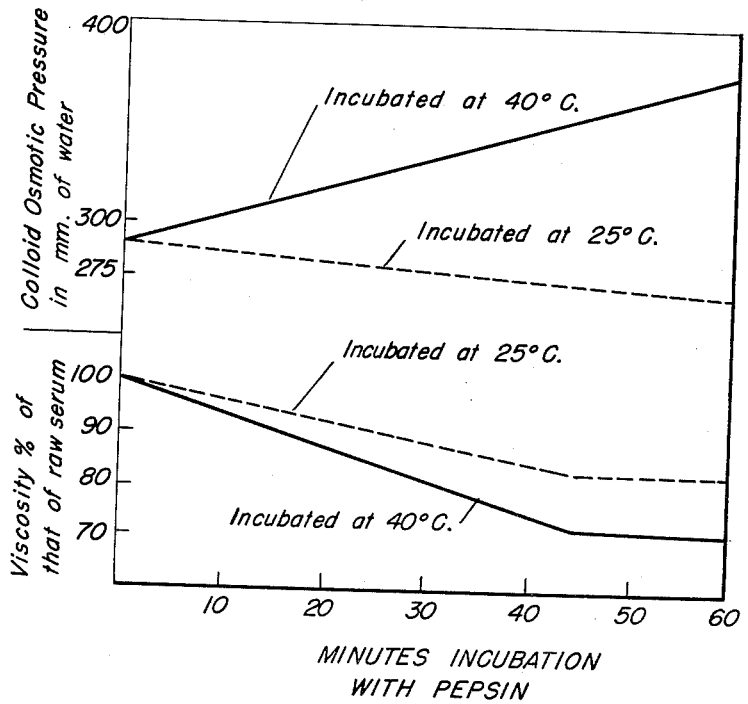
FIG. 2 is a graph showing the effect of temperature and time of treatment on the colloid osmotic pressure and viscosity values of the product of my invention.

As conducive to a more ready understanding of my invention, it is to be noted that to a progressively greater extent, demand presently exists for blood serum or plasma compatible with the human blood which can be readily and safely introduced into humans. And the further demand exists that such products be available in substantial quantities and within reasonable cost range.

In comparatively recent years so infrequent was the demand for introduction of additional blood into the human circulatory system that these requirements could be readily satisfied by professional blood donors, certainly so far as concerned those patients who could afford this rather unusual luxury. The present-day use of plasma, however, as a shock alleviant, as a blood extender and supplier, and for other generally similar and allied purposes, has become so great that organized blood collection on quantity scale has become an everyday necessity. This work has been conducted, in large measure, by the Red Cross, much of its product being channelled into the Armed Services for use either on the field or in storage banks.

But even with this organized effort to provide a continuing supply of human blood which is at least moderately reliable and with stable continuity of supply, demand has far outstripped available sources. And over recent years attention has been more and more directed to exploration of the possibility of using animal blood, other than of humans, as a source of serum or plasma which, regardless of source, can be safely introduced into the human circulatory system. Workers in the art uniformly have recognized that as an essential prerequisite of overlying importance this serum or plasma must be made compatible with the human blood. For obviously the use of such fluid could not be tolerated if there existed the slightest possibility of its incompatibility with the blood stream into which it is introduced. And in this connection it is worthy of comment that, particularly in the early research towards the introduction of human serum or plasma into the human circulatory system, incompatibility (and this, particularly where whole blood was employed) was observed in many instances between the product being introduced and the blood stream into which it was being injected. Obviously, when working with products of other than human origin, the problem of compatibility looms even greater than where human blood serves as a basis of the additive.

While many efforts have been directed to obtaining additives from animal blood sources, for one reason or another, they have uniformly fallen short of success. Either they were too complex or expensive; they were uncertain or unpredictable as to the resulting product; the product was incapable of storage with certainty; or it could not be assimilated into the human circulatory system with absolute safety. Lack of compatibility was but one of the many and varied reasons why these products did not achieve any appreciable recognition in the art.

An important object of my invention, therefore, is to provide a method of treating animal blood fluids in such manner as to achieve a solution of whole protein which can safely be utilized in men as a plasma expander, and which method is characterized by its low cost, its simplicity, its rapidity, its requirement of comparatively few manipulative and procedural steps, themselves simple and comparatively easily performed provided only that requisite precautions of sterility be rigorously observed. A further object is the provision of an inexpensive product which can be readily assimilated into the human blood stream with assurance of entire compatibility therewith.

Referring now to the practice of my invention, it is to be noted that as a first step, beef blood is collected at the abattoir or other point of slaughter of the cattle, or other generally similar animal such as sheep, swine, or horses. A first precaution, however, is that only young, healthy animals be employed, and these amply tested in advance and found to be free of disease, posssessing blood of adequate chemical, physical and biological properties. And the actual letting of blood and its collection must proceed under conditions of highest sterility. To this end the animal must be scrubbed, shaved and sterilized in the region of subsequent blood-letting, all in advance of slaughter. And following death, the region of blood-letting preferably is again sterilized before the blood is drawn.

This blood is collected, either in a sterile solution of sodium citrate or simply directly into a sterile vessel. In either case this draw-off takes place promptly following slaughter. In collecting in sterile vessel the blood is permitted to clot. And for precaution—and to ensure that it is settled stably—I allow the blood to stand for 20 minutes before moving it, as for example, transporting it to the treatment laboratory. Where the blood is collected in a solution of sodium citrate clotting is averted and it is taken directly to the treatment laboratory. In the treatment laboratory the blood, whether collected in the sterile vessel or in the sterile solution of sodium citrate, is stored at room temperature for approximately two hours. It is then refrigerated for 6 to 72 hours.

As a result of the protracted refrigeration, all sediment, comprised principally of blood cells, has cast to the bottom, and pure serum or liquid constituent of the blood overlies the same. This liquid—comprising the blood plasma or serum—floats on the cell layer.

My next step, prior to treating the plasma to make it compatible with human blood, is to withdraw the plasma itself from its sterile container, thus separating it finally from its cellular or solid component. And this separation is achieved with absolute sterility.

Thus, in aseptic manner, I withdraw the serum into vacuum bottles. Obviously, and as stated, special precautions are taken to keep the serum or citrated plasma sterile. Accordingly, following a preferred practice I treat the tops of the vacuum bottles with an iodine solution. Typically, I choose a 7% iodine solution. Next, I moisten cotton squares with alcohol, and place them on the iodinated bottle tops. I expose an air-way or aspirating needle to a hot flame at sterilizing temperature, and then plunge it into the double-holed stopper of the dispensing or storage bottle. This ensures enlargement of that opening to diameter sufficient for ready flow. Thereupon I remove the needle from this opening, which is now enlarged and is completely sterile. And I reflame the needle and plunge it into the other opening of this double-holed stopper. To conform with the requirement that this aspirating needle be shielded from direct contact with the air while not in immediate use I cover it with rubber tubing.

In connecting the dispensing bottle in proper manner with the collecting bottle I place the end of the aspirating needle in operable manner in the collecting bottle for the plasma or serum. A valve at the base of the aspirating needle has been previously sterilized in thorough manner, preferably by steam, and this before commencing the withdrawing operation. After sterilization this valve is completely closed prior to starting the operation of collecting the serum or citrated plasma. I observe care not to move or even disturb the needle when the valve is in its closed position.

After the two vessels are connected I open the valve and start aspirating the fluid. Always, however, I am careful to guard against placing the needle so low in the dispensing bottle as to come near to or to disturb the underlying layer of cells. This precaution contributes effectively to ensuring that no cells are carried over, either in or along with the serum or citrated plasma.

I provide, if thought desirable, an additional transfer procedure in which I interpose a Baxter or similar filter, preferably having a double nylon filter pad, to filter out any cells carried over.

At this stage the fluid is cell-free, aseptic, double-filtered and is conditioned for long standing, prior to use. It remains to render this fluid entirely compatible with human blood so that with safety it may be injected into human beings as a blood expander. To this end the product is so treated as to have controlled viscosity within acceptable range, controlled colloid osmotic pressure and controlled uniformity and comparatively small size of the solute protein molecule, all within a range which can be readily tolerated in the human circulatory system.

To achieve the objectives noted I convert the protein molecule of the treated serum with one or more selected proteolytic enzyme which, during process akin to fermentation, produce such changes in the proteins as to convert them into smaller bodies. Pepsin is the proteolytic enzyme which I prefer to employ. There are many reasons for my choice. Illustratively pepsin, unlike other animal enzymes, occurs naturally almost without admixture of other known proteolytic enzymes. It is therefore much more readily prepared in a pure state. As contrasted with enzymes of plant origin, pepsin has the advantage that it is self-limiting in its action. Less satisfactory to varying extent than pepsin, I find tripsin, "pancreatin", papain and ficin, among others, to be suitable proteolytic enzymes for the digestion and conversion of the protein content of the treated serum. And I prefer to use crystalline pepsin which has been dissolved in a suitable solvent, say a sufficient quantity of N/10 HCl.

Pepsin, I find, carries out its intended function of protein conversion only when set in an acid environment. Accordingly, to the treated raw beef serum, or treated serum from other suitable animal, or animals, I bring the pH value to 1.9 through the addition of a sufficient quantity of 2 N HCl. Usually for each liter of treated serum, this acidity is achieved through the addition of from 70 to 74 ml. of the 2 N HCl. With this acidity the treated serum is conditioned for conversion through incubation in pepsin.

For proper digestion of the protein content of the serum I now add 200 mg. of crystalline pepsin which has been dissolved in 50 mg. of N/10 HCl and allow this mixture to stand for approximately one hour at a temperature between 20° C. and 40° C., 25° C. usually being found preferable. Variation in temperature largely controls not only the molecular size of the protein, but as well the colloid osmotic pressure and the viscosity of the final product. Higher colloid osmotic pressure accompanies higher temperatures. And with the elevated temperatures a protein of lower molecular weight is achieved.

Experimental data attending reaction of the treated beef serum with the proteolytic enzyme pepsin provides the graphs of FIG. 2. In FIG. 2 the viscosity is given as percentage of that of raw serum, while the colloid osmotic pressure is expressed in millimeters of water. These values are plotted against time of incubation with pepsin, expressed in minutes. Data for these graphs was obtained through the use of four samples, all made from a single lot of raw beef serum previously treated to impart prolonged keeping qualities thereto. Sample preparation was identical in each instance except that two of the samples were pepsin-incubated at 25° C. while the other samples were incubated at 40° C. At each such temperature the time of incubation for one sample was 45 minutes while the time of incubation of the other sample was 60 minutes.

In making the tests noted the osmotic pressure was measured with a Krogh Osmometer as modified by Hill. Viscosity was determined through the use of an Ostwald Viscosimeter. As will be seen from FIG. 2 viscosity, measured as a percentage of the viscosity of the raw serum, is a function of the time required for the miniscus in the Ostwald viscosimeter to move between the two marks thereon.

I found during these investigations that protein conversion through pepsin incubation was nearly completed at the end of the first 45 minutes. As seen from the bottom of graph in FIG. 2, the viscosity fell in the treatment of all four samples, such decrease being more prominently in evidence in the sample treated at 40° C. The lower viscosity of the resulting blood-compatible solute protein is advantageous in certain instances in reducing the work load on the already overtaxed circulatory system of a heart patient.

With further reference to FIG. 2, the upper graph discloses that where the blood serum is treated at 40° C. a sharp rise in the colloid osmotic pressure is observed. On the other hand, with the sample incubated at 25° C., this pressure decreases slightly and linearly from that of the original sample. The colloid osmotic pressure can be closely controlled within the limits shown in FIG. 2 through proper selection of the digesting temperature. Illustratively and in other experiments which I conducted, not disclosed in FIG. 2, I was enabled through shortening the period of incubation to prepare a product displaying a colloid osmotic pressure less than 100 ml. of water.

Figure 3:
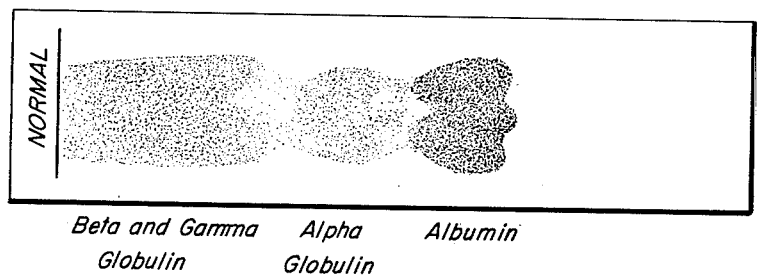
FIGS. 3 and 4 are ionographs of raw beef serum and treated beef serum of my invention, respectively, disclosing the results of electrophoretic analysis.
Figure 4:
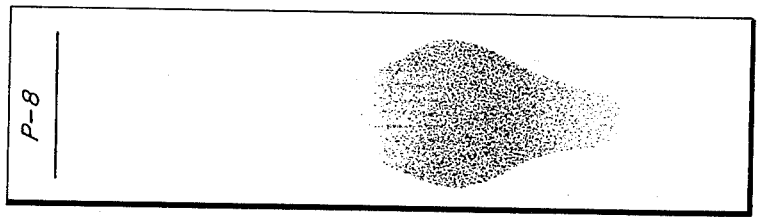

A measure of the compatibility of the treated serum in the human blood system is its anti-agglutinating qualities; and in turn, a measure of this latter is the electrophoretic qualities thereof, i.e., the degree of mobility or movement of electrically charged particles suspended in the serum. Accordingly, and to determine this quality of the pepsin-incubated protein I conducted electrophoretic analysis of each sample. Strips, as determined through the electron microscope, are disclosed in FIGS. 3 and 4. From these ionographs it will be seen (FIG. 3) that for the strip representing the distinct proteins which are present in the raw serum, namely alpha, beta and gamma globulin along with the albumins, these are replaced (FIG. 4) by a single and broad line having a mobility (an electrophoretic value) about the same as that of the albumins of the raw serum. Thus a satisfactory single product is obtained, displaying comparatively low viscosity. Further consideration of the ionograph of treated beef serum as disclosed in FIG. 4 establishes that the homogeneity of the converted solute protein is but slightly less than that of the albumin of the raw serum shown in the ionographs of FIG. 3. And that there is even less trailing time in the raw serum.

The important practical features of the foregoing are threefold.

First, pepsin imparts the desirable characteristic that the digestion of globulin is to substantially greater extent than of albumin. This is highly desirable since the raw globulin has far more effective antigenic effects than do the albumins, and thus are tolerated to far less extent in the human blood system.

Second, the pepsin-incubated product with homogeneous solute protein molecule can be advantageously administered intravenously without increase in the viscosity of the blood into which it is introduced. On the contrary, it can be reasonably expected to decrease this viscosity to a slight extent, the desirability of which has heretofore been pointed out in reducing the work load on the cardiac system.

And third, a close control of the colloid osmotic pressure of the converted product is made possible through variation of the temperature at which pepsin digestion takes place. This has important implication as concerns the many different clinical conditions under which it may be desirable to employ a plasma expander. Illustratively, where shock is encountered with tendency of the solute protein to leak out of the circulatory system, a plasma expander is desired possessing large solute molecules and displaying low colloid osmotic pressure. From FIG. 1 it is evident that pepsin incubation for such product according to my invention should be conducted within the lower temperatures, that is, approaching the 20° C. limit. It is readily seen that such product is less likely to leak out of the circulatory system.

Following reaction of the treated beef serum with pepsin under the incubation treatment just disclosed, I desire next to impart further compatibility of the product with the human blood. And I do this by washing it with an aqueous solution of formaldehyde. To set the environment for proper formaldehyde reaction, I first buffer the pepsin-converted serum to near neutrality, say pH 7.5, through the addition of 5 normal sodium hydroxide (5 N NaOH). I find through experiment that I can bring about this condition through the addition, for each liter of treated fluid, of about 35 ml. of 5 N NaOH. After thorough intermixture, followed by filtering to remove all sediment, I produce a fluid product conditioned for reaction with formaldehyde. Accordingly, and for each liter of the buffered fluid, I add about 10 ml. of 37% aqueous solution of formaldehyde. Incubation, with further conversion of the solute protein molecule of the serum, is conducted at room temperature for approximately 3 hours. Where desired, a shaker or the like is employed for such gentle agitation as to insure thorough and homogeneous intermixture. Formaldehyde incubation can of course be varied widely, say from between 5 minutes up to as long as 72 hours.

I now add ammonia water in an amount of approximately 0.1% by volume through the addition, with constant stirring, of about 10 ml. of concentrated $NH_4OH$ with a specific gravity of 0.88. This step is followed immediately through the addition of sufficient 5 normal sodium hydroxide to render the solution strongly alkaline with pH value of about 9.5. I accomplish this through the addition, by liter of formaldehyde-reacted serum, of about 10 ml. of 5 N NaOH.

The product is now conditioned for destruction of such agglutination factor or factors which may be present in the animal blood serum, as well as any other factors present therein tending to make incompatible the admixture of cell-free animal blood into the human blood stream. This incompatibility may illustratively display itself as physical incompatibility (e.g. formation of gels) or as immunologic incompatibility, illustrated by agglutination or cytolysis (disintegration or dissolution of the cells) of the erythrocytes or red blood corpuscles of the human recipient. The presence of these factors usually results in serious organic lesion or death. I bring about the desired adiaphoric action by raising the temperature of the formaldehyde-treated fluid to a point and for a length of time sufficient for the formaldehyde to destroy these undesired factors of the serum.

It is at this stage, under treatment by formaldehyde in the presence of heat, as well as in the prior buffering phase, that the activity of the pepsin enzyme is brought to final destruction. Typically, I achieve this by heating the formaldehyde-digested serum at a temperature ranging from about 90° C. to about 95° C. for a period of about 30 minutes. Actually I have found that the formaldehyde starts its destruction of the agglutination factor at about 35° C. And by starting at that temperature and thereafter progressively increasing the temperature quickly to the range indicated, thereupon holding the product at that temperature for about 30 minutes, it is ensured that thorough destruction of this agglutination factor or factors occurs. Any or all other specific chemical factors which may be present in the animal blood and which render the admixture of cell-free animal blood incompatible with human blood are likewise destroyed. I observe, following this treatment, that no precipitate is cast down as a result of the treatment. Thus the formaldehyde additive prevents gelation of the serum and coagulation thereof upon exposure to heat at pH 9.5. Any excess formaldehyde is converted by the ammonia which is present, into harmless hexamine.

The final product of my invention is now buffered with 2 HCl down to pH 7.2, about 20 ml. of 2 N HCl being required per liter of serum to bring about this neutralization.

The marked efficiency of the adiaphoric serum as a plasma expander is evident upon consideration of the data set forth in Table I below. In carrying out the experiments reported in Table I, a critical amount of blood of a canine subject was removed, the same being replaced with an equal amount by volume of adiaphoric serum, used as a plasma expander.

TABLE 1
*Adiaphoric Serum Injected Into Dogs*

| | Plasma, Volume, l. | Hematocrit | Total Blood, Volume, l. | Whole Blood Removed, l. | Percent TBV Removed | Replaced with ADS, l. | Survival 24 hr. | Survival 7 days |
|---|---|---|---|---|---|---|---|---|
| Hill #30 | .791 | .47 | 1.44 | .675 | 47 | .675 | + | + |
| Hill #31 | 1.24 | .50 | 2.38 | 1.12 | 47 | 1.12 | + | + |
| Hill #32 | 1.01 | .45 | 1.77 | .940 | 53 | .940 | + | + |
| Hill #33 | .880 | .44 | 1.52 | 7.60 | 50 | .760 | + | + |
| Hill #34 | 1.30 | .46 | 2.32 | 1.20 | 52 | 1.20 | + | + |

In interpreting the data of Table I it should be kept in mind that 45% hemorrhage (i.e. the draw-off of as much as 45% of the total blood content) in a dog is a lethal hemorrhage, and that 11 of the control animals thus treated died. Upon removing from 47% to 53% of the blood of the test animals, however, and thereupon promptly replacing the same with an equal amount of adiaphoric serum prepared according to the pepsin and formaldehyde-digestion of the cell-free serum of my invention, all animals were found to survive this treatment at the end of the first day, and to be living and in good condition at the end of the seventh day. Strong evidence was thus preliminarily afforded from a practical standpoint, as to the merit of my new product.

With the preliminary success noted, I thereupon injected the treated serum of my invention into human patients suffering from various disorders. These results are presented in Table II below:

TABLE II
*Adiaphoric Serum Injected Into Humans*

| Patient's Name | Age | Diagnosis | Blood Pressure. Pre-Infusion | Pulse Rate, Pre-Infusion | Blood Pressure. ADS Infused, ml. | Blood Pressure. Post-Infusion | Pulse Rate, Post-Infusion | Reaction |
|---|---|---|---|---|---|---|---|---|
| Z. M. | 47 | Compound fracture femur. | 110/78 | 120 | 1,000 | 154/96 | 120 | None. |
| P. McM. | 37 | 50% burn, 2nd and 3rd degree. | 82/58 | 144 | 1,000 | 96/68 | 132 | None. |
| L. I. | 21 | Bile peritonitis. | 92/66 | 124 | 1,000 | 142/74 | 118 | None. |
| S. A. F. | 44 | Fractured pelvis; ruptured bladder. | 83/56 | 140 | 1,000 | 94/62 | 136 | None. |
| M. C. | 26 | Ruptured ectopic pregnancy. | 92/66 | 100 | 1,000 | 118/72 | 100 | None. |

NOTE.—In all cases subsequent replacement with whole blood.

In each instance it will be seen that by the addition of my new serum the previously low blood pressure was restored to normal, and that little if any disturbance of pulse rate was observed. The injection of the serum was attended by no unfavorable reaction. In each instance a maximum of 1000 ml. of serum was injected. It is to be stressed that, in manner true of all plasma expanders, the amount for routine use should not exceed 1000 ml. Further substitution, as required, should be made using whole blood.

Should it be required at any time to regenerate the formaldehyde in my adiaphoric product, this is accomplished by boiling the same with 1:1 $H_2SO_4$. And the treated plasma can be tested for the product by putting 1 ml. plasma into a test tube, adding thereto 2 ml. of 1:1 $H_2SO_4$ and thereupon distilling the same into 2 ml. of $H_2O$ which I provide in a second test tube. Test is thereupon made for the formaldehyde content of this distillate, with chromotropic acid. Such acid treatment is necessary for formaldehyde demonstration because the latter does not display itself in the absence of such acid treatment.

Clinical tests, employing the chemistry just disclosed, were carried out to determine the retention of my new adiaphoric serum in canine subjects, in accordance with the following Table III. In each instance, more than one liter of blood was let from the subject and replaced by an equal volume of my new product.

TABLE III
*Retention of Treated Serum Injected Into Dogs*

| Subject | | Retention of Product, percent |
|---|---|---|
| Dog #1 | Immediate | 100 |
| | Days' post operative, 1 | 25 |
| | Days' post operative, 2 | 8 |
| | Days' post operative, 3 | 2 |
| Dog #2 | Immediate | 100 |
| | Days' post operative, 1 | 39 |
| | Days' post operative, 2 | 39 |
| | Days' post operative, 3 | 100 |
| Dog #3 | Immediate | |
| | Days' post operative, 1 | |
| | Days' post operative, 2 | 10 |
| | Days' post operative, 3 | 1 |

Thus it will be seen that I provide in my invention a product and method in which there are achieved the many objects and advantages hereinbefore set forth. My adiaphoric serum, thoroughly compatible with human blood, is new and different from any naturally occurring substances. It is especially different as to the protein content thereof.

The foregoing has been demonstrated electrophoretically. For it is known that the presence of more than one distinct boundary in a migrating protein solution is evidence of the presence of more than one protein entity in the solution. It is also known that in the treatment of a protein solution any change either in the rate of electrophoretical migration of the protein, in the number of distinct boundaries shown during electrophoretical migration, in the degree of boundary-spreading, or in any combination of these three changes, is evidence that the treatment has produced one or more new protein entities in the solution. All this follows as a necessary corollary to the conclusion that a single protein not only migrates with but a single boundary but that as well, the degree of the boundary spreading is no greater than corresponds to the diffusion constant of the protein. This general conclusion is vouched by John T. Edsell, discussing electrophoresis of proteins, at page 555 of vol. 1, Part B, of his work "The Protein," edited by Neurath and Bailey, 1954.

Reference to the electrophoretic records (FIGS. 3 and 4) clearly discloses that all three changes have occurred in beef serum treated according to my present practice. Accordingly, this electrophoretic data constitutes one link in my conclusion that adiaphoric serum produced according to my practice is different from and does not occur as a natural product.

Additionally, and from an altogether different approach, a determination of the osmotic pressure of the resulting product points strongly towards the conclusion that my treatment has in fact produced a new product differing, particularly in its solute protein constituent, from the raw serum initially undergoing treatment. In this connection it is accepted that the molecules of a sample of a strictly pure substance are all of the same kind and all of the same size. Accordingly, following determination of the osmotic pressure of a solution of known composition of such a substance, necessary data is at hand with which to calculate either the size of the molecule or the molecular weight of the substance. For the molecular weight is inversely proportional to the magnitude of the osmotic pressure. Thus a high osmotic pressure corresponds to a low molecular weight. Conversely a low osmotic pressure corresponds to a high molecular weight.

Accordingly, when a mixture of pure substances is put into solution and thereupon the osmotic pressure of the dissolved mixture is determined, the result obtained provides the data required to calculate the average molecular size of the molecules of the mixed solute. Test data shows that the colloid osmotic pressure of beef serum treated as described herein differs from that of the untreated serum. Obviously, therefore, and by the treatment disclosed I have changed the size of the molecules. And since the molecules of a pure substance are all of the same size, it follows that by my treatment I have produced one or more new substances in the serum. Thus a second item of proof is provided that the product according to the practice of my present method is quite different from the starting material.

Finally, the non-antigenic qualities of the present product as compared with the strongly antigenic qualities of the starting materials points conclusively to the production of an entirely different product from that initially undergoing treatment. This lack of antigenicity I established in four different ways, in each instance studying the specific reaction of raw beef serum on the one hand and beef serum treated by my new method on the other hand.

In the first such investigation I sensitized rabbits and guinea pigs by repeatedly injecting them, some with raw beef serum and some with beef serum treated according to my new practice. I found that when rabbits and guinea pigs, after first being treated with raw beef serum, were thereafter injected a second time with the same substance, and reacted most vigorously to this last injection. In most instances the subject dies. Substances producing reaction of this type are clearly antigenic. On the other hand, if after such initial injection, the rabbits and guinea pigs are injected with a different protein, the subject displays only a mild reaction, and frequently none at all.

Now, provided certain substances are initially injected in the test animals in exactly the same way as the raw beef serum or other antigenic material in an effort to sensitize them and are thereafter and following a suitable interval of time approximately the same as in the first tests, are again injected with the same substance, and should no reaction thereupon be observed following such last injection, it is reasonable to conclude that the substances injected are non-antigenic. Beef serum treated according to my new practice is non-antigenic in its response to such tests.

In a second series of studies I first "sensitized" rabbits and guinea pigs exactly in the manner just hereinbefore described. And, following a suitable time interval, blood was drawn from the subject and serum prepared. I then formed a precipitant by adding minute quantities of raw beef serum to the serum drawn from the subject which had previously been sensitized to raw beef serum. The foregoing comprises a routine precipitin test, and discloses that the raw beef serum has antigenic properties.

As contrasted with this and to disclose the strongly non-antigenic properties of my new serum, I tested another set of animals, initially injected with beef serum treated according to my new method in an effort to sensitize them, with even much larger samples of my treated beef serum. No trace of precipitate appearing, this constitutes a negative precipitin test and discloses that the treated beef serum is non-antigenic.

As a third investigation I applied cross-precipitin tests. That is, I first injected test animals with my treated serum. And thereafter I injected raw beef serum. No precipitate was formed. The test was negative. Similarly, having first sensitized the test animal with raw beef serum, subsequent injection of my treated serum produced no precipitate. Here again the cross-precipitin test was negative.

Finally, I divided a number of female guinea pigs into two groups. One such group I sensitized to raw beef serum as described in the two techniques immediately above. The second group I treated in the exact same manner except that the attempted sensitizing agent which I employed was my new and treated serum. Following a reasonable time I sacrificed the guinea pigs. I excised the uteri. I suspended strips of these organs in appropriate saline solution. Thereupon, I added raw beef serum into some of the oxygenated, saline baths into which the uterine strips were suspended, while I added my new product to the other baths.

In those cases where raw beef serum was added and with the uterine strips already sensitized to raw beef serum, these strips contracted vigorously. Their contraction was much more rapid and to a much shorter total length than was true of the slow rhythmic contraction of the untreated strips. By sharp contrast, the uterine strips from guinea pigs preliminarily treated with my new serum displayed no change from the normal rhythmic contraction. And when thereafter my new treated serum was added to these baths, none of the strips departed from the normal rhythmic contraction that it had displayed. This highly sensitive test for antigenicity is a final proof conclusive that my new product is not an antigen.

I find that by my new method, a product can be readily achieved in simple and real manner, new in itself, and closely responding in controlled and predictable manner to precise dimensioning and control of both the solute protein molecule and of the colloid osmotic pressure. Through the practice of my invention the resulting product can be nicely adapted for the precise therapeutic purpose for which it is to be employed. Procedural and manipulative steps, expense of ingredients and time of process required to produce this end result are all correlated into a composite minimum.

Moreover, the new product attending the practice of my present method may be safely stored for prolonged periods of time, say as long as 24 months. While in some instances prolonged storage may produce minor precipitation of fibrin threads, filtration directly removes these in ready manner. No harmful effect whatsoever in subsequent use, attends such prolonged storage.

Not only may my serum be stored safely at room temperatures, but in many instances I find it desirable to do so. This is so, even where wide and rapid temperature ranges are encountered.

The new product, injected in the human blood stream, increases the volume of the blood of the patient. As well, concentration of blood protein of the patient is increased to the same extent as observed upon transfusion of an equivalent quantity of human plasma. With nice control of the physical and pathological qualities of the resulting product, my new method enables production of blood expander in requisite quantity, all with reduced production costs and required sterility, displaying requisite storage qualities and subsequent compatibility with the blood of human patients.

The utility of my invention has been demonstrated by the ability to revert the plasma protein level to normal in patients in whom, because of starvation or because an inadequate dietary protein intake could not be achieved, a plasma deficiency was observed. It has also been demonstrated to be an efficient plasma expander in cases of so-called shock, with hypotension and other clinical evidence of an underfilled vascular compartment. In these cases this material has been efficacious as a plasma expander.

All the foregoing, as well as many other thoroughly practical advantages attend the practice of my invention.

It is apparent from the foregoing that many embodiments of my invention will readily suggest themselves to those skilled in the art, once the broad aspects of my invention are disclosed. And that similarly, many modifications of the present embodiment will likewise come to mind. Accordingly, I intend the foregoing disclosure to be considered solely by way of illustration, and not by way of limitation.

I claim as my invention:

1. The method of preparing sterile and cell-free beef serum which is thoroughly compatible with the blood stream of the human patient in which it is to be injected, comprising first drawing off beef blood and standing to clot; standing the resulting serum at room temperature and then refrigerating for about 6 to 72 hours to cast down blood cells and other sediment; decanting and filtering to collect the serum; rendering the serum acid to about pH 1.9 through the addition of hydrochloric acid and converting the solute protein content of the serum by digestion with pepsin at a temperature of about 20° C. to 40° C. for about 45 to 60 minutes; thereafter buffering the pepsin-treated serum to about pH 7.5 with sodium hydroxide and incubating the buffered serum in the presence of formaldehyde at room temperature for about 5 minutes to 72 hours; next destroying the agglutination factor and other antigenic factors of the treated serum by adding concentrated ammonia water thereto and sodium hydroxide to about pH 9.5 and reacting the serum at about 90° to 95° C. for about 30 minutes; and finally buffering to about pH 7.2 with hydrochloric acid.

2. The method of preparing sterile and cell-free beef serum which is thoroughly compatible with the blood stream of the human patient into which it is to be injected, comprising first adding 70 to 74 ml. of 2 N HCl for each liter of serum, sufficient to acidify to about pH 1.9; next converting the solute protein content of the serum by adding, for each liter of serum, about 200 mg. of crystalline pepsin dissolved in 50 ml. of N/10 HCl, followed by incubation for about 45 to 60 minutes at a temperature between about 20° C. and 40° C.; thereafter buffering the pepsin-treated serum to about pH 7.5 through the addition of about 35 ml. of 5 N NaOH for each liter of serum and incubating at room temperature for about 3 hours in the presence of about 10 ml. of 37% formaldehyde for each liter of serum; next destroying the agglutination factor and other antigenic factors of the treated serum by adding concentrated NH$_4$OH (spg. 0.88) in the amount of about 10 ml. for each liter of serum, alkalizing the serum to about pH 9.5 through the addition of about 10 ml. 5 N NaOH per liter of serum, and reacting the serum for about 30 minutes at a temperature of about 90° C. to 95° C.; and buffering to about pH 7.2 with about 20 ml. 2 N HCl per liter of serum.

3. In a method of preparing from raw beef blood serum a blood expander compatible with human blood, the steps of converting the solute molecule content thereof by incubating the same in the presence of pepsin at temperatures ranging between about 20° C. and 40° C. at about pH 1.9 for about 45 to 60 minutes; then buffering to about pH 7.5 and incubating at room temperature for some 5 minutes to 72 hours in the presence of formaldehyde; and then destroying the agglutination factor and other antigenic factors by reacting with ammonium hydroxide, alkalizing to about pH 9.5 and heating for about 30 minutes at about 90° C. to 95° C.

4. A solution of the whole protein of beef blood, pepsin-digested and formaldehyde-converted to physical and therapeutic qualities adapted for use as a human blood expander, produced according to the method of claim 1.

5. A solution of the whole protein of beef blood, pepsin-digested and formaldehyde-converted to physical and therapeutic qualities nicely adapting it for use as a blood expander, produced according to the method of claim 2.

References Cited in the file of this patent

Sumner: Chemistry and Methods of Enzymes, Academic Press, N.Y., 3rd. ed., 1953, pp. 16–29, 48, 49, 166–169.
Science, 97:2512, Feb. 19, 1943, pp. 10, 12.
Gutfreund: Biochem. J., 39:2, 1945, pp. 186–188.
Melka: The Lancet, Sept. 13, 1947, pp. 382–383.
Boesen: The Lancet, Feb. 28, 1948, pp. 325, 326.
Blood and Plasma Proteins, Their State in Nature, Academic Press, N.Y., 1953, pp. 184.
The Enzymes, Academic Press, vol. 2, part 2, 1952, p. 1330.
Science News Letter, Oct. 30, 1943, p. 280.
Haurowitz: Chemistry and Biol. of Plasma Proteins, Academic Press Inc., N.Y., 1950, p. 290.